United States Patent [19]

Dekosky

[11] Patent Number: 5,135,814
[45] Date of Patent: Aug. 4, 1992

[54] ARTICLES AND METHOD OF STRENGTHENING ALUMINUM OXYNITRIDE

[75] Inventor: Melissa B. Dekosky, Indialantic, Fla.
[73] Assignee: Raytheon Company, Lexington, Mass.
[21] Appl. No.: 607,016
[22] Filed: Oct. 31, 1990
[51] Int. Cl.$^5$ .................................................. B32B 15/04
[52] U.S. Cl. ...................................... 428/432; 428/698
[58] Field of Search ................................ 428/698, 432

[56] References Cited

U.S. PATENT DOCUMENTS

| | | | |
|---|---|---|---|
| 4,756,976 | 7/1988 | Komeya et al. | 428/698 |
| 4,882,212 | 11/1989 | Singhdeo et al. | 428/76 |
| 4,930,731 | 6/1990 | Roy et al. | 501/120 |
| 4,957,886 | 9/1990 | Mathers et al. | 51/307 |

OTHER PUBLICATIONS

R. L. Gentilman, et al., "Strength and Thermal Shock Resistance of Sapphire and Strengthened Sapphire," 33rd Pacific Coast Regional Meeting, The American Ceramic Society, Oct. 27, 1980, 10 pages.

Primary Examiner—Edith L. Buffalow
Attorney, Agent, or Firm—Richard M. Sharkansky

[57] ABSTRACT

Surface compression layers are provided over aluminum oxynitride by coating a base of said material with a glass frit having a thermal expansion coefficient lower than that of the material, and firing the frit to glass the glass frit after firing the base and coating are allowed to cool thus placing the coating in compression.

15 Claims, 2 Drawing Sheets

ARTICLES AND METHOD OF STRENGTHENING ALUMINUM OXYNITRIDE

BACKGROUND OF THE INVENTION

This invention relates generally to optical elements, and more particularly to strengthening of optical elements which are transparent in both the visible and infrared range of optical wavelengths for use on a missile or another air flight vehicle.

As it is known in the art, there is a need for materials which are highly durable and which have substantial transparency in both the visible and infrared optical wavelength ranges. Applications for these materials include commercial systems, such as various vapor lamps and optical windows, as well as military systems, such as airborne optical imaging systems as found, for example, on a missile or the like.

With the aforementioned airborne optical imaging systems, such as those found on an infrared heat sinking missile, one or more optical elements, such as a window or a dome is mounted on an exterior portion of the missile to isolate the remaining optics of the imaging system from an external environment through which the missile is flown.

Thus, in addition to having the aforementioned substantial transparency in both the visible and infrared spectrums, these external elements must also have a particularly high degree of resistance to environmental exposures while having sufficient strength to protect the remaining components of the imaging system during operation of the missile.

Several materials have been identified as potential candidate materials for these applications. Amongst these materials are single crystal sapphire (cubic aluminum oxide) and aluminum oxynitride (AlON). These materials, in particular, have a very high degree of strength and are capable of having a relatively high degree of infrared transparency particularly over the wavelength range of about 0.2 microns up to about 5 microns. For infrared dome materials for use in medium wavelength infrared bands, i.e. the 3-5 micron band, AlON and single crystal sapphire are two superior candidate materials since each have relatively high degrees of strength and relatively high degree of infrared transmittance. Sapphire is currently the stronger of the two materials. However, sapphire is also extremely expensive to fabricate since it must be grown as a single crystal. Polycrystalline sapphire is not suitable for optical applications since polycrystalline sapphire has very high birefringence, thus making polycrystalline sapphire material unsuitable for imaging infrared optical energy.

It is known that compressive surface coatings can be provided over sapphire to increase fracture and flexural strengths. One approach has been to deposit SiO. Another approach has been to use a glass frit high in $SiO_2$ content.

Although single crystal sapphire is a strong material, it is very difficult and expensive to fabricate. Moreover, for many applications it would also be desirable to provide domes and like elements fabricated from materials which are less expensive than sapphire but which have high levels of strength.

SUMMARY OF THE INVENTION

In accordance with the present invention, a method of strengthening an optical infrared element comprised of aluminum oxynitride, comprises the steps of disposing, to a predetermined thickness, a glass frit having a coefficient of thermal expansion which is less than that of AlON over at least one surface portion of said optical element and heating said optical element having the glass frit coating to an elevated temperature to cause said glass frit coating to glaze thus forming a compressive glaze coating over the optical element. With such an arrangement, by providing a glass frit having a coefficient of thermal expansion which is lower than the coefficient of thermal expansion of AlON when the glass frit is cooled after glazing the thermal expansion of the glaze will be less than the thermal expansion of the base. Thus, after cooling, the coating will be placed in compression. This compressive surface increases the flexural strength of the material.

In accordance with a further aspect of the present invention, an optical element is comprised of a base of aluminum oxynitride and a coating disposed over a surface portion of said base comprised of a glazed, glass frit material. With such an arrangement, if the glazed glass frit is disposed in surface compression on the oxide an optical element having a improved strength characteristic is provided. Furthermore, if the glass frit material has a chemical composition which allows said frit to react with surface portions of the material of the base, additional or high increases in strength characteristic of the material of the base will be provided.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENTS

Figure 1:
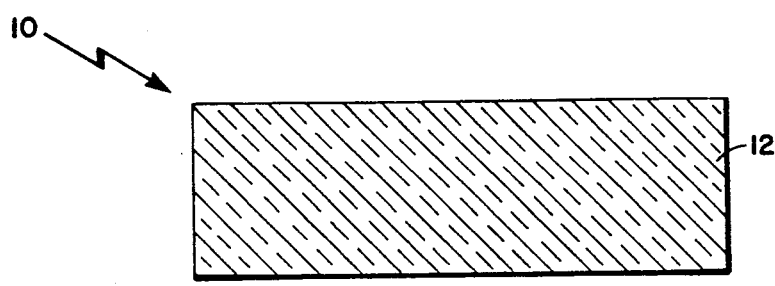
FIG. 1 is a cross-sectional view of a plate.

Referring now to FIG. 1, an element here an optical element 10 comprised of a substrate 12 of optically transparent polycrystalline aluminum oxynitride (AlON) is shown. Although optical element 10 is here represented as a plate obviously optical element 10 could alternatively be a dome or a lens, for example or an other suitable shaped optical element.

Figure 2:
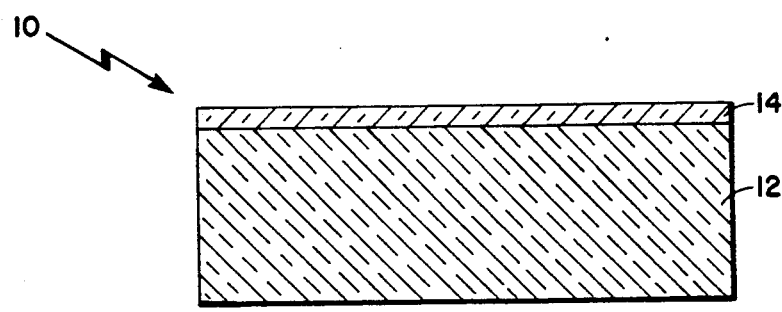
FIG. 2 is a cross-sectional view of the plate shown in FIG. 1 having a glass frit coating disposed over one surface thereof.

Referring now to FIG. 2, the optical element 10 has disposed thereover a glass frit layer 14 having a desired thickness. The glass frit layer 14 is preferably disposed over at least one major surface of the base of optical element 10 by any suitable technique such as by spraying or air brushing a suspension containing the glass frit. For example, the suspension containing the glass frit can be sprayed with an air brush or a sprayer with the base mounted on a platform which is rotated to insure uniform application of the frit. For aluminum oxynitride, a suitable glass frit is a glass frit which is high in silicon dioxide. For example, suitable glass frits include glass frit types V519 (Vitrifunctions, Greensburg, PA)

and GF8 (General Color & Chemical, Minerva, OH). Generally suitable frits will have an $SiO_2$ content between about 30% up to about 70% by weight.

It is preferred for optical applications that the glass frit have a relatively high optical transparency at least over the desired wavelength portion for use of the optical element. For AlON this wavelength range would be at least in the range of 0.2 microns to 5 microns and particularly in the range of 3-5 microns for solely infrared applications. Moreover, in addition to the aforementioned optical transparencies in the thickness deposited, the glass frit should also have a coefficient of thermal expansion which is lower than the corresponding coefficient of thermal expansion for AlON. Other glass frit materials having the aforementioned characteristics are also available and will provide greater or lesser improvements in strength with greater or lesser effects on optical transparency. Furthermore, in many instances it may also be preferable to provide a glass frit having an index of refraction ($n_g$) which is intermediate the index of refraction of AlON ($n_a$) and air (n) and more particularly related to the index of refraction of the material of the base $n_g = \sqrt{n_a \cdot n}$.

Figure 3:
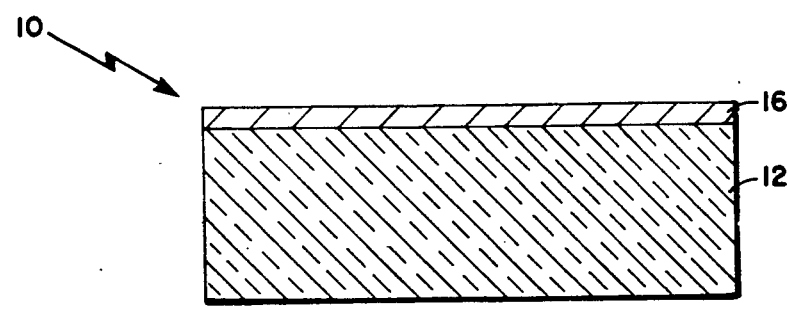
FIG. 3 is a cross-sectional view of the plate as shown in FIG. 2 having the glass frit surface of FIG. 2 converted into a glazed glass frit.

Referring now to FIG. 3, the optical element 10 as shown in FIG. 2 is disposed in a furnace (not shown). The plate is heated to an elevated temperature determined principally in accordance with the type of glass frit used to glaze the glass frit, that is to have the glass frit particles melt and refloat to form a glazed coating 16. Typical glazing temperatures for glass frits are in the range of 800° C. to 1,000° C. and are generally a specified characteristic of the particular glass frit used. After the plate is heated to the elevated temperature and the glass frit is glazed, the sample is removed from the furnace and allowed to cool. Since the coefficient of thermal expansion of the glazed coating is lower than the coefficient of thermal expansion of the material of the base, the coating will be placed in a state of mechanical compression and thus provide a relatively hard and strong surface layer over the optical element.

Furthermore, particularly with the aforementioned glass frits having a high silica content, it is believed that an interfacial chemical reaction occurs between the material of the base and the material of the glaze to cause a strong bonding therebetween and furthermore to cure or overcome surface defects or flaws in the material of the base. This occurrence is, in particular, believed responsible for the extremely high increases in mechanical strength characteristics provided to optical elements using the aforementioned glaze layer.

An alternative application technique is to provide layer 16 in a series of sequential coatings. That is, layer 16 can be formed by a series of alternating sequences of depositing of the glass frit material and heating of the glass frit material at an elevated temperature to drive off the solvent to provide a final thickness. That is, initially the sample is weighed and an initial layer of glass frit is deposited over the base 12. The base 12 is heated to drive off the solvent carrier used in depositing the glass frit. After the solvent has been driven off, the base 12 and frit are weighed. The differences between this weight and the initial weight, in conjunction with the known density of the frit can be used to calculate thickness. If necessary, the sample is deposited with a second and subsequent coatings of glass frit which are heated to drive off the solvents, and provide a thicker coating. By repeatedly determining the weights after each depositing step, the thickness of the coating can be controlled and repeated from sample to sample. Other techniques are, of course, also possible.

For the glass frits described above, the glass frits were combined with a suspension of di-ionized water and Methocel binder (obtained from Dow Chemical). Other suspensions which are suitable for spraying or other suspensions including glass frits which may be dipped, for example, are also possible. Moreover, it is also possible to place the coating layer 16 over all surfaces of the optical element.

AlON has isotropic thermal expansion characteristics. That is, AlON coefficients of thermal expansion of AlON are substantially equal in each direction of the material. Accordingly, since the amount of strengthening is related to the difference in the coefficients of thermal expansion of the material of the base and the material of the optical element, any glaze should strengthen any surface of the AlON element by substantially the same amount. Moreover, the amount of surface compression provided in the coatings is related to the differences in thermal expansion coefficients between that of the coating and the base by the equation $\sigma = (\Delta\alpha \, \Delta T \, E_{dome})/(1-\mu)$ where $\sigma$ equals the compressive stress in the coating layer $\Delta\alpha$ equals the difference in thermal expansion coefficients between that of the coating layer and the material of the base, $\Delta T$ is a temperature range over which the coating layers were fired, E equals Young's modulus, and $\mu$ equals Poisson's Ratio.

The Table below shows the biaxial flexura strength tests for samples of uncoated AlON and coated AlON with the V519 type coating. One inch diameter samples of each coated and uncoated material were broken using biaxial flexural testing techniques such as concentric ring on ring flexural lists as commonly known. Each of these samples further had a thicknesses of 0.100 inches and the coatings had thicknesses of 0.001 inches.

TABLE sample diameter: 1.000"
sample thickness: 0.100"
coating thickness: 0.001"

| Uncoated | | Coated | |
| --- | --- | --- | --- |
| Sample # | Strength (psi) | Sample # | Strength (psi) |
| 1 | 51,360 | A519-1 | 119,314 |
| 2 | 43,261 | A519-2 | 111,427 |
| 3 | 62,192 | A519-3 | 118,129 |
| 4 | 33,831 | A519-4 | 101,321 |
| 5 | 33,892 | A519-5 | 131,012 |
| 6 | 62,177 | A519-6 | 109,189 |
| 7 | 39,451 | A519-7 | 129,369 |
| 8 | 53,161 | A519-8 | 115,767 |
| 9 | 45,310 | A519-9 | 132,497 |
| 10 | 60,586 | A519-10 | 108,332 |
| Avg. = 48,522 | | Avg. = 117,636 | |

The measured strength for each uncoated sample and each coated sample are given in the Table and the average strengths for the uncoated and the coated samples are given at the bottom of the Table. As it is shown, the average strength of the AlON has been increased by approximately 140% using the V519 type coating.

Figure 4:
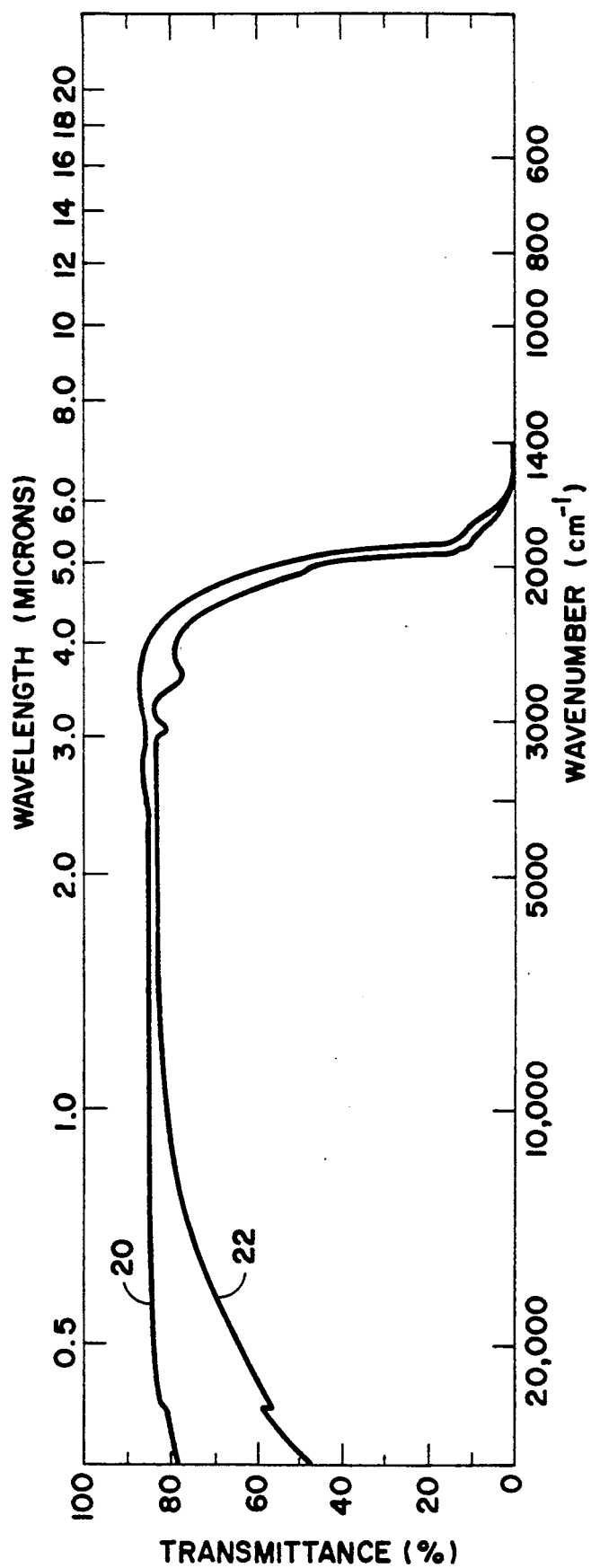
FIG. 4 is a graph showing percent inline optical transmission as a function of wavelength for coated and uncoated samples of AlON.

Referring now to FIG. 4, transmittance data comparing a uncoated sample curve 20 and a coated sample curve 22 of AlON are shown. The uncoated sample of AlON, here being 0.1 inches thick, has an optical transmittance of approximately 80% over the wavelength range of 0.5 microns to 4.3 microns. The coated sample of AlON, using the V519 coating, has an optical transparency of at least 60% over the range of 0.5 microns up to near 80% at 1 microns and substantially 80% from 1 micron out to about 4 microns.

It is believed that the decline in transparency at the short wavelengths (i.e. <1u) is related principally to scattering effects which may have been caused by surface irregularities in the glass frit. Thus, more careful control of the glass frit surface characteristics may have resulted in improved optical transparency over the lower wavelength ranges. Nevertheless, over the critical 3 to 5 micron range, there is substantial agreement with the optical characteristics of the uncoated material for the coated material.

Having described the preferred embodiments of the invention, it will now become apparent to one of skill in the art that other embodiments incorporating their concepts may be used. It is felt, therefore, that these embodiments should not be limited to disclosed embodiments but rather should be limited only by the spirit and scope of the appended claims.

What is claimed is:

1. An element comprising a base of aluminum oxynitride and a coating disposed over said base comprised of a glazed glass frit in surface compression.

2. The element, as recited in claim 1, wherein said base has a surface portion adjacent said coating which is chemically bonded with said compressed glazed frit.

3. The element, as recited in claim 2, wherein a portion of said aluminum oxynitride has a thickness of about 0.1 inches and a strength characteristic substantially greater than 62,000 psi.

4. The element, as recited in claim 3, wherein said strength characteristic is in the range of approximately 100,000 to 132,000 psi.

5. The element as recited in claim 1 wherein said base has a first coefficient of thermal expansion characteristic and said coating has a second coefficient of thermal expansion characteristic with said first coefficient of thermal expansion characteristic having a value greater than a value of said second coefficient of thermal expansion characteristic.

6. An optical element comprising:
   a base of aluminum oxynitride having a predetermined optical transmittance over at least a portion of an optical wavelength range of about 0.5 microns to 5 microns; and
   a coating disposed over said base comprised of a glazed glass frit in surface compression, with said optical element including said coating and at least a portion of said base supporting said coating having optical transparency of at least 60% over the optical wavelength range of 0.5 microns to 5 microns with said portion of said base having a thickness of about 0.1 inches.

7. The optical element as recited in claim 6 wherein said coating comprises a glass containing silicon dioxide.

8. The optical element as recited in claim 7 wherein said aluminum oxynitride base has a thickness of about 0.1 inches and said coating has a thickness less than 0.005 inches.

9. The optical element as recited in claim 6 wherein said portion of said base has an optical transparency of about 80% over the wavelength range of 1 micron to 4 microns.

10. An element comprising a base consisting of aluminum oxynitride and a coating disposed over said base comprised of a glazed glass frit in surface compression.

11. The element as recited in claim 10 wherein said base has a surface portion adjacent said coating which is chemically bonded with said compressed glazed glass frit.

12. The element as recited in claim 11 having a predetermined optical transmittance over at least a portion of an optical wavelength range of about 0.2 microns to 5 microns and an optical transparency of at least 60% over said optical wavelength range.

13. The element as recited in claim 12 wherein said coating comprises a glass containing silicon dioxide and has a thickness less than 0.005 inches.

14. The element, as recited in claim 13, wherein a portion of said aluminum oxynitride has a thickness of about 0.1 inches and a strength characteristic substantially greater than 62,000 psi.

15. The element, as recited in claim 14, wherein said strength characteristic is in the range of approximately 100,000 to 132,000 psi.

* * * * *